United States Patent [19]

Nakama et al.

[11] Patent Number: 5,126,017
[45] Date of Patent: Jun. 30, 1992

[54] PROCESS FOR PRODUCING ELECTRICALLY CONDUCTIVE POLYMER FILM BY ELECTROLYTIC POLYMERIZATION

[75] Inventors: Katsumi Nakama; Hiroyuki Satoh, both of Shizuoka, Japan

[73] Assignee: Toho Rayon Co., Ltd., Tokyo, Japan

[21] Appl. No.: 752,794

[22] Filed: Aug. 30, 1991

[30] Foreign Application Priority Data

Aug. 31, 1990 [JP] Japan .................................. 2-230152

[51] Int. Cl.$^5$ ............................................. C25B 3/00
[52] U.S. Cl. ...................... 205/159; 204/72; 204/78; 205/162; 205/317
[58] Field of Search .................. 204/56.1, 72, 78

[56] References Cited

U.S. PATENT DOCUMENTS 4,985,124 1/1991 Claussen .................. 204/72

FOREIGN PATENT DOCUMENTS 1-230627 9/1989 Japan .

*Primary Examiner*—T. M. Tufariello
*Attorney, Agent, or Firm*—Sughrue, Mion, Zinn Macpeak & Seas

[57] ABSTRACT

A process for producing an electrically conductive polymer film which comprises electrically polymerizing a monomer, capable upon polymerization of providing conjugated double bonds, in an electrolytic polymerization solution containing a fluorocarbon surfactant and a dopant electrolyte using a working electrode and a counter-electrode immersed in the electrolytic polymerization solution, with the proviso that for an anodic oxidation electrolytic polymerization a fluorocarbon surfactant except an anionic fluorocarbon surfactant is used, and for a cathodic reduction electrolytc polymerization a fluorocarbon surfactant except a cationic fluorocarbon surfactant is used.

14 Claims, 1 Drawing Sheet

PROCESS FOR PRODUCING ELECTRICALLY CONDUCTIVE POLYMER FILM BY ELECTROLYTIC POLYMERIZATION

FIELD OF THE INVENTION

The present invention relates to a process for producing an electrically conductive polymer film which is suitably used for production of plastic batteries, capacitors, non-linear optical materials, and the like. More particularly, this invention relates to a process for producing an electrically conductive polymer film by means of electrolytic polymerization in which process an electrically conductive polymer film having excellent surface characteristics and a uniform weight distribution is produced at a high efficiency.

BACKGROUND OF THE INVENTION

A process in which a monomer is chemically polymerized using an oxidizing agent or a reducing agent and an electrolytic polymerization process in which a working electrode and a counter-electrode are placed in an electrolytic polymerization solution consisting of a combination of monomer/electrolyte/solvent and polymerization is conducted electrochemically by applying an electric voltage between the two electrodes are well known as polymerization methods for producing electrically conductive polymers such as polypyrrole, polythiophene, and others.

Since electrically conductive polymers having electrical conductivities currently used in practical applications are infusible and insoluble, the electrolytic polymerization process in which the desired polymer is deposited as a film on the working electrode is being adopted where the polymer is to be used in the form of a film. Further, since only specified substances react on the electrode surface in the process, in the electrolytic polymerization process inclusion of impurities is less apt to occur as compared with the chemical polymerization process.

In the electrolytic polymerization process, an electrically conductive polymer in film form is deposited on the working electrode surface and gradually grows into a thick film, upon application of an electric voltage between the two electrodes. In this case, the surface of the electrically conductive polymer film on its growing side tends to become rough. Further, in some cases, tubular structures form on the surface of the electrically conductive polymer film [F. T. A Vork & L. J. J. Janssen, *Electro-chim Acta*, 33 [11], 1513–1517 ('88)]. In extreme cases, the tubular structures grow into stalagmitic structures similar to "bellflowers" (refer to FIG. 1 attached hereto). Depending on the conditions, such "bellflowers" grow gregariously over the whole polymer film surface.

Although the mechanism of the formation of such "bellflowers" has not been elucidated, their development and growth are as follows. In the initial stage of the electrolytic polymerization, an electrically conductive polymer is deposited on the working electrode surface to thereby color the electrode. Development of "bellflowers" is not observed in this initial stage of polymerization, but small bubbles are generated on the electrode at a certain stage of the polymerization. Thereafter, nuclei parts of the "bellflowers" develop beneath the bubbles and, as the polymerization proceeds, the nuclei grow to lift up the bubbles, which also enlarge gradually. Although the "bellflowers" grow to various sizes depending on the polymerization conditions, there are cases where the diameter of the "bellflowers" becomes as large as 1 mm and the height as high as 2 to 3 mm when an electrically conductive polymer film having a thickness of about 10 to 200 micrometers is prepared.

The "bellflowers" can be easily removed from the film. However, not only the removal of the "bellflowers" causes the film surface to be rough thereby impairing the commercial value of the polymer film, but the resulting film has an uneven in weight distribution and there also is a cost disadvantage because the removed material has no commercial value.

In order to solve such problems, it has, for example, been proposed to cover the cathode with a porous diaphragm which is less gas-permeable; this expedient is based on the assumption that the cause of the development of surface roughness is the adhesion of bubbles formed at the counter-electrode to the polymer film being produced by polymerization (JP-A-1-230627). (The term "JP-A" as used herein means an "unexamined published Japanese patent application".) On the other hand, it has now been found that lowering the current density (electric current value/area of immersed electrode) during electrolytic polymerization is effective. However, the former expedient is disadvantageous because the electrode structure becomes intricate, while the latter expedient has problems in that the rate of polymerization becomes low impairing production efficiency and in that the electrically conductive polymer film obtained has a reduced electrical conductivity.

SUMMARY OF THE INVENTION

The present invention has been completed in view of the above-described circumstances, and an object is to provide a process for producing an electrically conductive polymer film which process provides an electrically conductive polymer film having excellent surface state and a uniform weight distribution at a high efficiency.

The process for producing an electrically conductive polymer film according to the present invention comprises electrically polymerizing a monomer, capable upon polymerization of providing conjugated double bonds, in an electrolytic polymerization solution containing a fluorocarbon surfactant and a dopant electrolyte using a working electrode and a counter-electrode immersed in the electrolytic polymerization solution, with the proviso that for an anodic oxidation electrolytic polymerization a fluorocarbon surfactant except an anionic fluorocarbon surfactant is used, and for a cathodic reduction electrolytic polymerization a fluorocarbon surfactant except a cationic fluorocarbon surfactant is used.

DETAILED DESCRIPTION OF THE INVENTION

Figure 1:
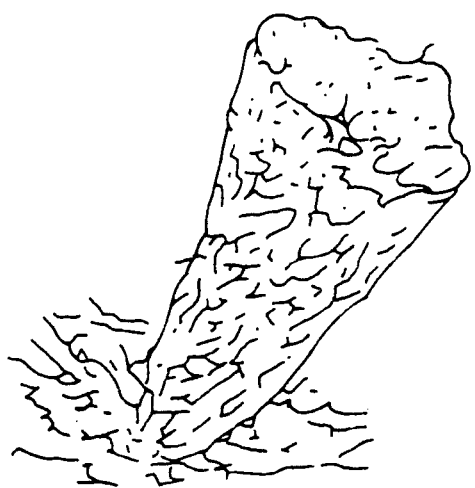
FIG. 1 is a schematic view illustrating a "bellflower".

The fluorocarbon surfactant used in the present invention may be a commercially available fluorocarbon surfactant. Examples thereof include anionic surfactants such as ammonium perfluoroalkylsulfonates, potassium perfluoroalkylsulfonates, and potassium perfluoroalkylcarboxylates, amphoteric surfactants such as perfluoroalkylbetaines, nonionic surfactants such as perfluoroalkyl-ethylene oxide adducts, perfluoro(polyoxyeylene ethanol), perfluoroalkylalkoxylates, and fluorinated alkyl esters, cationic surfactants such as perfluoroalkyl quaternary ammonium salts, and the like. These surfactants usually have 2 to 20 carbon atoms.

The kind of the fluorocarbon surfactant used in this invention should be suitably selected according to the electrolytic polymerization conditions employed. A fluorocarbon surfactant which is stable at the pH of the polymerization solution being prepared or being used in polymerization should be selected. For an anodic oxidation electrolytic polymerization, a nonionic surfarctant, an amphoteric fluorocarbon surfactant, or a cationic surfactant is used and for a cathodic reduction electrolytic polymerization, a nonionic surfactant, an amphoteric fluorocarbon surfactant or an anionic fluorocarbon surfactant is used. For example, nonionic surfactants such as a perfluoroalkylpolyoxyethylene ethanol and the like are preferred for use with a polymerization solution comprising pyrrole, an alkylbenzenesulfonate (such as sodium p-toluenesulfonate and sodium benzenesulfonate and water). Pyrrole, thiophene, furan, aniline and benzene are generally polymerized by an anodic oxidation electrolytic polymerization, and 1,4-dibromobenzene usually polymerized by a cathodic reduction electrolytic polymerization.

It is preferable that this fluorocarbon surfactant be added simultaneously with preparation of the polymerization solution. The concentration of the fluorocarbon surfactant is generally from 0.01 to 0.5 g/l and more preferably from 0.1 to 0.4 g/l. If the concentration of the surfactant is below 0.01 g/l, the effect of preventing the surface of the electrically conductive polymer film from becoming rough or developing "bellflowers" is not sufficient. On the other hand, concentrations thereof exceeding 0.5 g/l are also not preferred because bubbles form in the polymerization solution in an increased amount and, as a result, the amount of the deposited polymer is reduced and the thus-obtained polymer film has a reduced electrical conductivity, although the surface of the electrically conductive polymer film can be prevented from becoming rough or developing "bellflowers".

Polymerization solutions for use in electrolytic polymerization may be strongly acidic or strongly basic, or the pH's of the solutions may change from acidic to basic values or vice versa or from neutral to acidic or basic values in the course of the polymerization.

In the production of an electrically conductive polymer film by electrolytic polymerization according to the present invention, a fluorocarbon surfactant is added to the polymerization solution comprising a combination of monomer/electrolyte/solvent.

The monomers that can be used for production of the film in this invention are those which can provide conjugated double bonds in the chemical structure of the polymer. Examples of such monomers include pyrrole, thiophene, furan, aniline, benzene, and derivatives thereof. Examples of derivatives of such 5-membered heretocyclic compounds include those which have an alkyl (preferably a straight chain alkyl group (e.g., —$C_{12}H_{24}$)), alkoxy (e.g., —$OC_8H_{17}$) or acyl (e.g., —$COC_7H_{15}$) group (preferably having 1 to 15 carbon atoms) at the $\beta$-position thereof. Examples of derivatives of aniline and benzene include those which have an alkyl (e.g., —$CH_3$), alkoxy (e.g., —$OCH_3$) or acyl (e.g., —$COCH_3$) group (preferably having 1 to 15 carbon atoms) at the o- or m-position thereof. Benzene substituted with halogen atoms, such as Cl, Br, and F, at the 1- and 4-positions (e.g., 1,4-dibromobenzene) may also be used. Other monomers or a mixture of monomers may also be used as long as the monomer used can produce an electrically conductive polymer film through electrolytic polymerization.

It is considered that the monomers have the following formula, respectively.

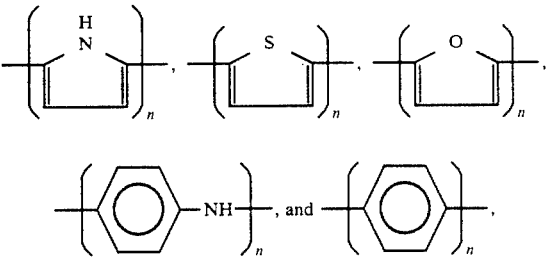

wherein n represents the degree of polymerization.

The electrolyte used in this invention is not limited in kind so long as it can be incorporated as a dopant (which provides electroconductivity to the polymer) into the electrically conductive polymer to be formed. Examples thereof include $LiBF_4$, $HBF_4$, $BF_3$, $PF_3$, $AsF_6$, $HNO_3$, $H_2SO_4$, $HClO_4$, HCl, $FeCl_3$, $MoCl_5$, 7,7,8,8-tetracyanoquinodimethane (TCNQ) complexes, alkylsulfonates (e.g., salts of Na, K, Li or $NR_4$ wherein R represents a hydrogen atom or an alkyl group, each group represented by R may be the same or different), alkylbenzenesulfonates (e.g., salts of Na, K, Li or $NR_4$, wherein the definition of R is the same as above), phthalocyanines, porphyrins, and the like.

Examples of solvents which can be used in this invention for dissolving the monomers, the electrolyte and the fluorocarbon surfactant include water, organic solvents such as an alcohol, acetonitrile, nitromethane, nitrobenzene, propylene carbonate, tetrahydrofuran, dimethylformamide, and the like, and mixed solvents composed of water and these organic solvents. The solvent should not be those which dissolve the polymer produced.

The composition of the electrolytic polymerization solution may be suitably selected from those conventionally employed ones according to the kind, film thickness, and properties (such as mechanical strength, modulus elasticity, elongation and electric conductivity) of the electrically conductive polymer film to be produced. In general, however, the monomer concentration is preferably from 0.01 to 2 mol/l (in an aqueous polymerization system it is more preferably from 0.1 to 1 mol/l), and the electrolyte concentration from 0.01 to 5 mol/l (in an aqueous polymerization system it is more preferably from 0.05 to 2 mol/l). If the monomer concentration is outside the range of from 0.01 to 2 mol/l and/or if the electrolyte concentration is outside the range of 0.01 to 5 mol/l, a polymer having insufficient electroconductivity is produced.

The amount of the electrolyte incorporated into the polymer is changed according on the kind of the monomer and conditions of the electrolytic polymerization. The amount is usually from 0.01 to 1 mol per mol of a monomer unit. An electrically conductive polypyrrole preferably contains an electrolyte in an amount of from 0.1 to 0.40 mol per mol of a monomer unit.

The material of the working electrode used in the present invention may be any of the electrode materials used in ordinary electrolytic polymerization. Examples thereof include platinum, gold, stainless steel, nickel, carbon, conductive glasses obtained by the vapor deposition of iridium/tin oxide on the surfaces of glasses, and the like. For production of a polypyrrole film, it is preferred to use a stainless steel electrode. The shapes of these materials may be as a form of a plate, gauze, etc. As the carbon material, carbon fibers may also be used in addition to ordinary carbon materials. In this case, carbon fibers may be used in the form of a carbon fiber-containing composite material insoluble in the polymerization solution, a woven cloth of carbon fibers, or the like. On the other hand, the material for the counter-electrode also is not particularly limited so long as the counter-electrode material used is insoluble in the polymerization solution and has electrical conductivity. Any of the above-enumerated materials may be used also as the counter-electrode material.

The working electrode and the counter electrode may be placed by any manner, however, usually they are placed in the electrolytic solution either vertically or holizontally. When the electrodes are placed holizontally, the working electrode is preferably placed beneath the counter electrode.

In conducting the electrolytic polymerization, the constant-voltage method or the constant-current method may be used, or a method in which the voltage or current is changed stepwise, pulse-like, or cyclically (using a positive or a negative current) may also be used. Polymerization conditions including voltage value, current value, electrical quantity, polymerization temperature, polymerization atmosphere, and the like may be suitably selected depending on the kind, properties, and film thickness of the electrically conductive polymer film to be produced and other factors. For example, in the polymerization of pyrrole, the preferred electric current is from 0.01–20 mA/cm$^2$ (in a constant-current method), the preferred voltage is from 0.5 to 2 volts (vs. hydrogen standard electrode: in a constant-voltage method), the preferred temperature is from 0° to 50° C., and the preferred atmosphere is air or an inert atmosphere such as nitrogen gas atmosphere.

According on the present invention electrically conductive polymer film having a thickness from about 10 to 200 μm is obtained with especially remarkable effects of the present invention.

According to the present invention, an electrically conductive polymer film free from surface defects can be easily produced by electrolytic polymerization. The thus-produced electrically conductive polymer film is peeled from the working electrode. The film is washed and dried (which may be conducted under a reduced pressure). The film obtained can be used in applications such as battery electrodes, capacitors, electrically conductive films, heating elements, and the like. The film produced on an electrode may also be used without peeling from the electrode. After washing and drying the film with the electrode can be used as an active material of a secondary battery.

The present invention is explained below in more detail with reference to examples, but the invention is not to be construed as being limited to these examples. Unless otherwise indicated, all parts, percents, ratios and the like are by weight.

EXAMPLE 1

As a polymerization solution was used 100 ml of a pure water solution containing 0.25 mol/l of pyrrole (Py), 0.75 mol/l of sodium p-toluenesulfonate (PTS), and 0.05 g/l of a perfluoroalkyl(polyoxyethylene ethanol) (trade name, Fluorad FC-170C; manufactured by Sumitomo 3M Limited, Japan) as a fluorocarbon nonionic surfactant. A stainless-steel plate (SUS304) having a size of 5×4 cm was used as a working electrode (anode), and a stainless-steel gauze (SUS304, 16 mesh) of the same size was used as a counter-electrode (cathode). The two electrodes were disposed horizontally in a colorless and transparent electrolytic cell made of glass in such a manner that the counter-electrode was placed over the working electrode at a distance of 1 cm. In this electrolytic cell, the above-described polymerization solution was introduced. As a lead wire for passing electricity from a power source to each electrode, a stainless-steel wire (SUS304, diameter 0.2 mm) was connected with each electrode at one end part thereof in the lengthwise direction. The electrolytic polymerization solution was kept at 20° C. Nitrogen gas was bubbled through the polymerization solution for 30 minutes at a flow rate of 150 ml/min, and the space in the electrolytic cell was then purged for 30 minutes at the same nitrogen gas flow rate. Thereafter, electrolytic polymerization was initiated. Throughout the polymerization, purging with nitrogen gas was continued at the same flow rate. The electrolytic polymerization was conducted by the constant-current method in which the electric current was kept at 3.2 mA/cm$^2$ using a galvanostatometer and the electrical quantity was 25 C/cm$^2$ (polymerization time was about 2.2 hours). As a result, a polypyrrole film of black color was obtained on the working electrode. No "bellflower" was observed on this polymer film with the naked eye.

Figure 2:
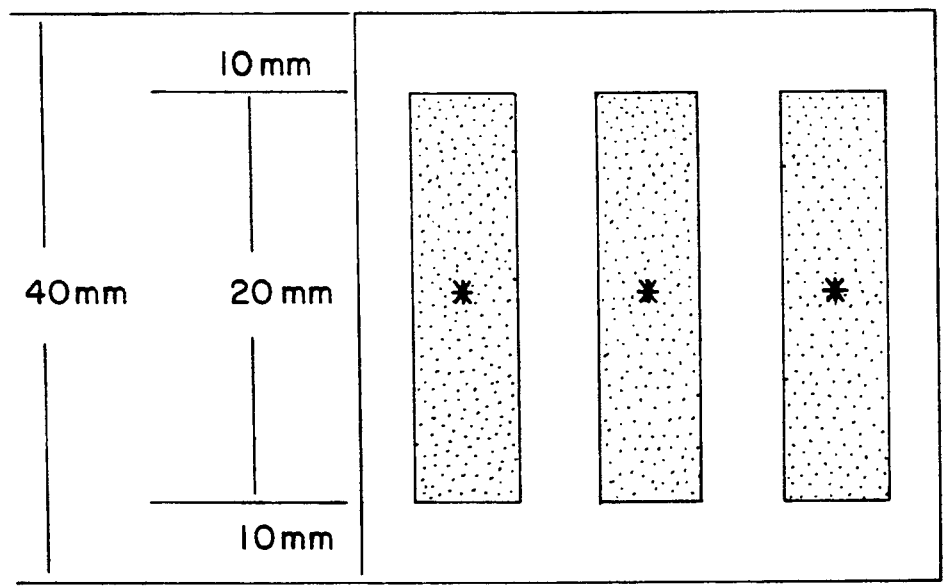
FIG. 2 shows the positions from which test pieces are cut.
Figure 2:
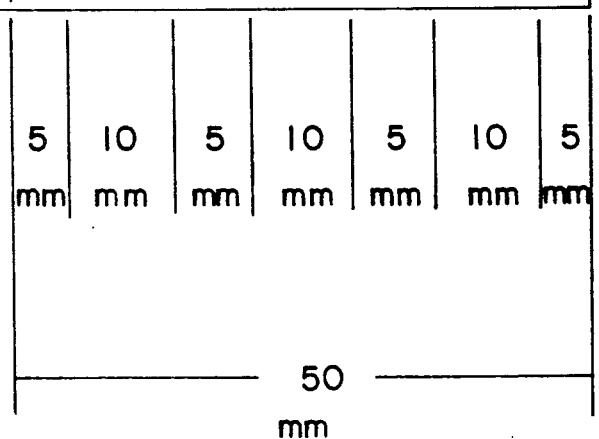

After completion of the polymerization, the working electrode was removed from the electrolytic cell and washed sufficiently with pure water and then with acetonitrile. The polypyrrole film was peeled carefully from the electrode. The thus-obtained polypyrrole film was subjected to Soxhlet extraction with acetonitrile for 30 minutes in a nitrogen gas atmosphere, and then vacuum-dried at 80° C. for 2 hours. Thereafter, the weight and thickness of the film were measured at three points (which each was in the center of the film and shown with an asterisk in FIG. 2). Further, test pieces of 20×10 mm were cut from the film, and their electrical conductivities were measured by passing an electrical current of 0.1 mA therethrough using the four-point prove method and calculating the electrical conductivity from the resulting voltage drop.

The results of the polypyrrole property measurements obtained are shown in Table 1 below.

EXAMPLES 2 TO 5

Polypyrrole films were produced using the same conditions and method as those in Example 1 except that the concentration of the fluorocarbon surfactant was changed. As a result, "bellflowers" formed on the surface of the electrically conductive polymer film where the fluorocarbon surfactant concentration was low, but the number of the "bellflowers" was small, which could be judged by examination from the outside of the electrolytic cell. The polypyrrole films obtained were washed, dried, and then the weight and thickness were measured, in the same manner as in Example 1.

The results of these measurements are shown in Table 1 below together with the "bellflower" number.

COMPARATIVE EXAMPLE 1

A polypyrrole film was produced using the same conditions and method as those in Example 1 except that a fluorocarbon surfactant was not used. Eleven minutes after the initiation of polymerization, small bubbles formed on the surface of the working electrode and, with the lapse of time, the number of such bubbles increased and the polymer film grew selectively beneath the bubbles with "bellflowers" of polypyrrole developing. After the polymerization, the "bellflowers" were found to have grown to diameters of about 0.5 mm and heights of about 1 mm. The polypyrrole film formed was washed, dried, and then the weight and thickness were measured, in the same manner as in Example 1. Although the exact number of "bellflowers" was not determined because they fell relatively readily from the polypyrrole film during these procedures, the number of "bellflowers" formed was well above 20 per 20 cm$^2$ of the electrode. Because of the loss of the "bellflowers", the weight of the polypyrrole film obtained was measured again after the remaining "bellflowers" were removed by hand. Therefore, the difference in weight between the polypyrrole film obtained in Example 1 and that obtained in Comparative Example 1 can be regarded as a measure of the weight of the "bellflowers" which fell off or were removed (in other words, the "bellflowers" which had developed). The results obtained are shown in Table 1 below.

COMPARATIVE EXAMPLE 2

A polypyrrole film was produced using the same conditions and method as those in Comparative Example 1 except that the current density was changed to 0.8 mA/cm$^2$. The time period required for this polymerization was about 8 hours and 40 minutes, which was about 4 times those in Examples 1 to 5 and Comparative Example 1. "Bellflowers" were formed on the surface of the electrically conductive polymer film thus obtained, but the number of the "bellflowers" was small, which could be judged by examination from the outside of the electrolytic cell. The polypyrrole film obtained was washed, dried, and then the weight and thickness were measured, in the same manner as in Example 1. The results of these measurements are shown in Table 1 below together with the "bellflower" number.

Although the number of "bellflowers" developed on the surface of the electrically conductive polymer film was small in this comparative example, this method is defective in that the time required to complete the polymerization was long and the electrical conductivity of the polymer film obtained was low as compared with those in the Examples of the invention.

EXAMPLE 6 AND COMPARATIVE EXAMPLE 3

Two polypyrrole films were produced in the same conditions and method as those in Example 1 except that perfluoroalkyl quaternary ammonium iodide (trade name, Fluorad FC-135; manufactured by Sumitomo 3M Limited) was used as a cationic fluorocarbon surfactant and potassium perfluoroalkylcarbonate (trade name, Florad FC-129; manufactured by Sumitomo 3M Limited) was used as an anionic fluorocarbon surfactant, instead of the nonionic fluorocarbon surfactant, respectively. The thus obtained results are shown in Table 1 below.

As can be seen in Table 1, the cationic surfactant provided excellent results, however, the anionic surfactant did not provide excellent results in preventing of formation of "bellflowers" and the polymer obtained had a lower electrical conductivity.

TABLE 1

| Example | Components in Polymerization Solution | | Current Density (mA/cm$^2$) | Polymerization Time (hr) | Number of "Bellflowers" (per 20 cm$^2$) | Weight (mg/cm$^2$) | | | |
|---|---|---|---|---|---|---|---|---|---|
| | | | | | | Position 1 | Position 2 | Position 3 | Average |
| 1 | Py | 0.25 mol/l | 3.2 | 2.2 | 0 | 15.0 | 15.4 | 14.7 | 15.0 |
| | PTS | 0.75 mol/l | | | | | | | |
| | PC-170C | 0.05 g/l | | | | | | | |
| 2 | Py | 0.25 mol/l | 3.2 | 2.2 | 2 | 15.7 | 15.1 | 14.4 | 15.1 |
| | PTS | 0.75 mol/l | | | | | | | |
| | PC-170C | 0.01 g/l | | | | | | | |
| 3 | Py | 0.25 mol/l | 3.2 | 2.2 | 0 | 14.9 | 14.4 | 14.0 | 14.4 |
| | PTS | 0.75 mol/l | | | | | | | |
| | PC-170C | 0.1 g/l | | | | | | | |
| 4 | Py | 0.25 mol/l | 3.2 | 2.2 | 0 | 14.3 | 14.5 | 14.3 | 14.4 |
| | PTS | 0.75 mol/l | | | | | | | |
| | PC-170C | 0.2 g/l | | | | | | | |
| 5 | Py | 0.25 mol/l | 3.2 | 2.2 | 0 | 13.9 | 13.6 | 13.4 | 13.6 |
| | PTS | 0.75 mol/l | | | | | | | |
| | PC-170C | 0.4 g/l | | | | | | | |
| 6 | Py | 0.25 mol/l | 3.2 | 2.2 | 0 | 14.9 | 15.3 | 14.7 | 15.0 |
| | PTS | 0.75 mol/l | | | | | | | |
| | PC-170C | 0.1 g/l | | | | | | | |
| Comparative Example | | | | | | | | | |
| 1 | PY | 0.25 mol/l | 3.2 | 2.2 | >20 | 10.5 | 10.4 | 9.4 | 10.1 |
| | PTS | 0.75 mol/l | | | | | | | |
| 2 | Py | 0.25 mol/l | 0.8 | 8.7 | 2 | 13.2 | 13.2 | 13.9 | 13.4 |
| | PTS | 0.75 mol/l | | | | | | | |
| 3 | Py | 0.25 mol/l | 3.2 | 2.2 | >20 | 12.5 | 10.3 | 11.9 | 11.6 |
| | PTS | 0.75 mol/l | | | | | | | |
| | FC-129 | 0.1 g/l | | | | | | | |

| Thickness (μm) | Electrical Conductivity (S/cm) |
|---|---|

TABLE 1-continued

| Example | Position 1 | Position 2 | Position 3 | Average | Position 1 | Position 2 | Position 3 | Average |
| --- | --- | --- | --- | --- | --- | --- | --- | --- |
| 1 | 109 | 112 | 106 | 109 | 216 | 214 | 223 | 218 |
| 2 | 114 | 109 | 104 | 109 | 227 | 193 | 196 | 205 |
| 3 | 108 | 104 | 101 | 104 | 192 | 194 | 199 | 195 |
| 4 | 104 | 105 | 104 | 104 | 168 | 153 | 151 | 157 |
| 5 | 101 | 98 | 97 | 99 | 132 | 129 | 132 | 131 |
| 6 | 108 | 111 | 107 | 109 | 187 | 185 | 180 | 184 |
| Comparative Example | | | | | | | | |
| 1 | 78 | 75 | 66 | 73 | 225 | 191 | 201 | 206 |
| 2 | 96 | 96 | 101 | 98 | 140 | 115 | 112 | 122 |
| 3 | 91 | 75 | 86 | 84 | 125 | 135 | 143 | 134 |

While the invention has been described in detail and with reference to specific embodiments thereof, it will be apparent to one skilled in the art that various changes and modifications can be made therein without departing from the spirit and scope thereof.

What is claimed is:

1. A process for producing an electrically conductive polymer film which comprises electrically polymerizing a monomer, capable upon polymerization of providing conjugated double bonds, in an electrolytic polymerization solution containing a fluorocarbon surfactant and a dopant electrolyte using a working electrode and a counter-electrode immersed in the electrolytic polymerization solution, with the proviso that for an anodic oxidation electrolytic polymerization a fluorocarbon surfactant except an anionic fluorocarbon surfactant is used, and for a cathodic reduction electrolytic polymerization a fluorocarbon surfactant except a cationic fluorocarbon surfactant is used.

2. The process of claim 1, wherein the monomer is pyrrole, thiophene, furan, aniline, benzene or a derivative thereof.

3. The process of claim 1, wherein the fluorocarbon surfactant is an anionic fluorocarbon surfactant, an amphoteric fluorocarbon surfactant, a cationic fluorocarbon surfactant or a nonionic fluorocarbon surfactant.

4. The process of claim 3, wherein the fluorocarbon surfactant is selected from the group consisting of ammonium perfluoroalkylsulfonates, potassium perfluoroalkylsulfonates, potassium perfluoroalkylcarboxylates, perfluoroalkylbetaines, perfluoroalkyl-ethylene oxide adducts, perfluoro(polyoxyethylene ethanols), perfluoroalkylalkoxylates, fluorinated alkyl esters, and perfluoroalkyl quoternary ammonium salts.

5. The process of claim 1, wherein said dopant electrolyte is $LiBF_4$, $HBF_4$, $BF_3$, $PF_3$, $AsF_6$, $NHO_3$, $H_2SO_4$, HCl, $FeCl_3$, $MoCl_5$, 7,7,8-tetracyanoquinodimethane complex, an alkylsulfonate, an alkylbenzenesulfonate, a phthalocyanine, and a porphyrin.

6. The process of claim 1, wherein said electrolytic polymerization solution comprises a solution of water, an organic solvent or a mixture of water and an organic solvent.

7. The process of claim 1, wherein the polymerization is an anodic oxidation electrolytic polymerization and said fluorocarbon surfactant is an amphoteric fluorocarbon surfactant, a nonionic fluorocarbon surfactant or a cationic fluorocarbon surfactant.

8. The process of claim 1, wherein the polymerization is a cathodic reduction electrolytic polymerization and said fluorocarbon surfactant is an amphoteric fluorocarbon surfactant, a nonionic fluorocarbon surfactant or an anionic fluorocarbon surfactant.

9. The process of claim 1, wherein the amount of the surfactant in the polymerization solution is from 0.01 to 0.5 g/l.

10. The process of claim 1, wherein the concentration of the monomer in the polymerization solution is from 0.01 to 2 mol/l.

11. The process of claim 1, wherein the concentration of the dopant electrolyte in the polymerization solution is from 0.01 to 5 mol/l.

12. The process of claim 1, wherein the material of the working electrode is platinum, gold, stainless steel, nickel, carbon, or a conductive glass obtained by vapor deposition of iridium/tin oxide on the surface of glass.

13. The process of claim 1, wherein the monomer is pyrrol and the material of the working electrode is stainless steel.

14. The process of claim 1, wherein the monomer is pyrrol, the electrolyte is an alkylbenzene sulfonate and the solvent is water.

* * * * *